(12) United States Patent
Wang (10) Patent No.: US 8,720,381 B2
(45) Date of Patent: May 13, 2014

(54) PET GROOMING TOOL

(76) Inventor: Huo-Pia Wang, Chang-Hua (TW)

( * ) Notice: Subject to any disclaimer, the term of this patent is extended or adjusted under 35 U.S.C. 154(b) by 0 days.

(21) Appl. No.: 13/301,591

(22) Filed: Nov. 21, 2011

(65) Prior Publication Data

US 2013/0125829 A1    May 23, 2013

(51) Int. Cl.
*A01K 13/00*    (2006.01)

(52) U.S. Cl.
USPC .......................................... 119/611; 119/618

(58) Field of Classification Search
USPC ......... 119/611, 613, 617, 625, 631, 632, 618, 119/620, 628, 633; D30/159; 132/126; 30/49, 356, 357
See application file for complete search history.

(56) References Cited

U.S. PATENT DOCUMENTS

| 1,814,528 | A | * | 7/1931 | Purcell | 30/304 |
|---|---|---|---|---|---|
| 4,288,921 | A | * | 9/1981 | Rhynes | 30/304 |
| 4,970,990 | A | * | 11/1990 | Wilhelmi | 119/601 |
| 6,199,513 | B1 | * | 3/2001 | Nichols | 119/625 |
| 7,255,705 | B2 | * | 8/2007 | Hsu et al. | 606/167 |
| 7,717,067 | B2 | | 5/2010 | Porter et al. | |
| 7,748,350 | B2 | * | 7/2010 | Vandervoet | 119/618 |

FOREIGN PATENT DOCUMENTS

DE            10310167 A1 *  9/2004  ............. A61K 13/00

OTHER PUBLICATIONS http://www.merriam-webster.com/dictionary/point.*

* cited by examiner

*Primary Examiner* — Rob Swiatek
*Assistant Examiner* — Danielle Clerkley
(74) *Attorney, Agent, or Firm* — Christie, Parker & Hale, LLP (57) ABSTRACT

A pet grooming tool includes a plurality of tine members and dematting members juxtaposed with one another along a shaft axis of a mounting shaft to be secured to a handle assembly. Each tine member has front and rear edge surface extending to join with each other to form a tine tip. Each dematting member has a dematting blade region extending to terminate at an inclined distal edge surface, and having a blade cutout portion which extends from the inclined distal edge surface to form a dematting blade tip that is disposed rearward from the tine tip for preventing injury to a user or a pet. The pet grooming tool will rake or comb a pet by means of the tine members while cutting tangles and mats of the undercoat of the pet by means of the dematting members.

8 Claims, 13 Drawing Sheets

PET GROOMING TOOL

BACKGROUND OF THE INVENTION

1. Field of the Invention

This invention relates to a pet grooming tool, more particularly to a pet grooming tool which can be used to cut hair mats of pets when grooming.

2. Description of the Related Art

A variety of pet grooming tools, such as grooming brushes, combs, clippers, etc, are commercially available for grooming pets and removing tangled and matted hair.

Figure 1:
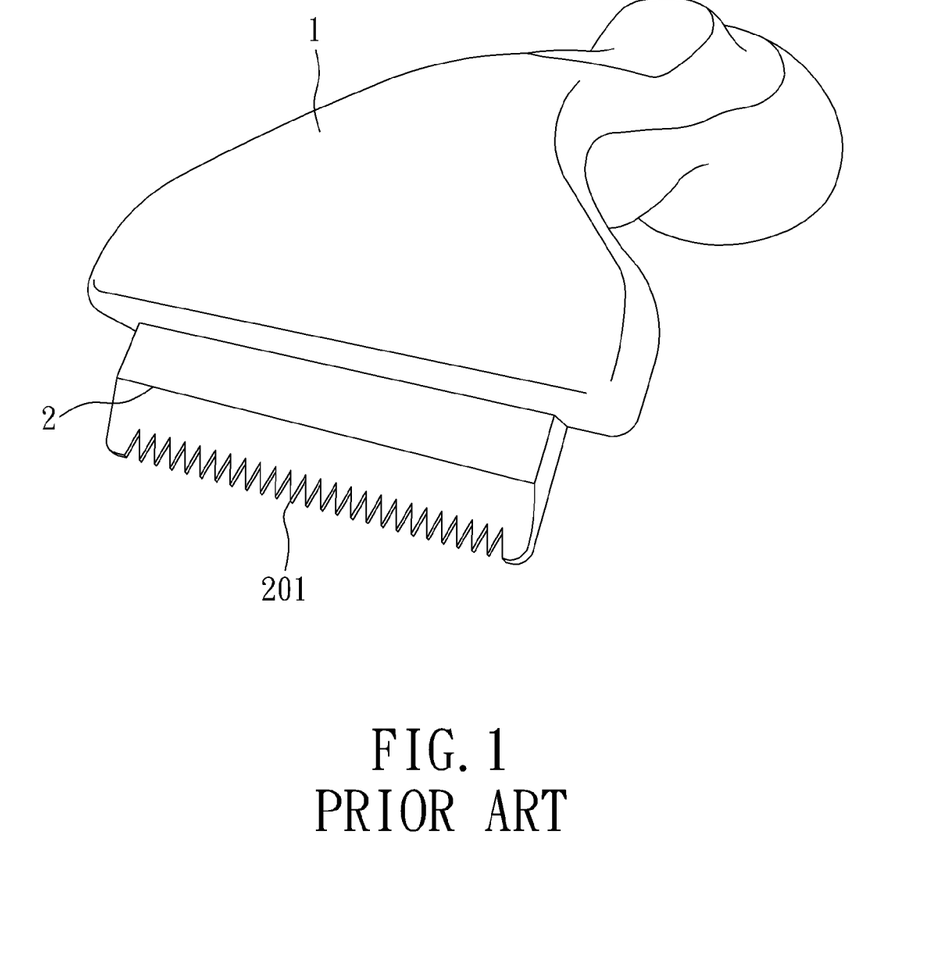
FIG. 1 is a perspective view of a conventional pet grooming tool disclosed in U.S. Pat. No. 7,717,067 B2.
Figure 2:
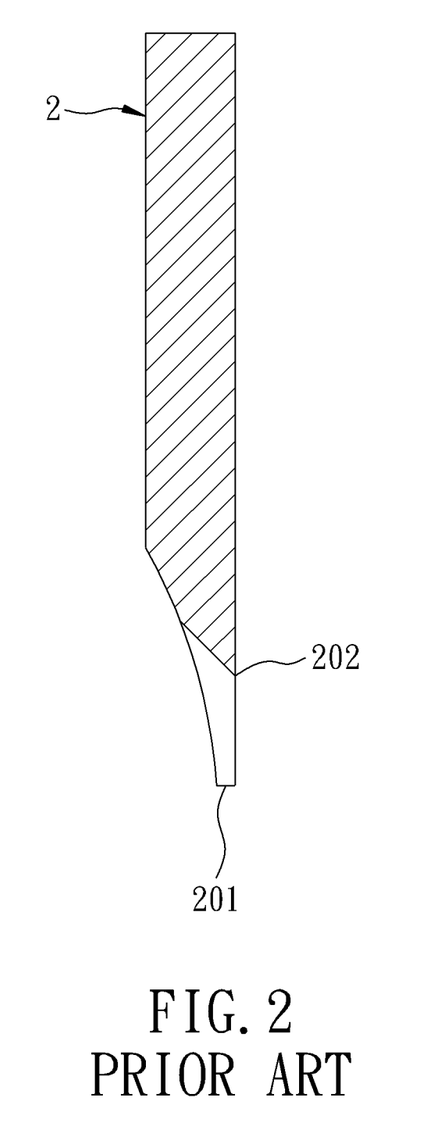
FIG. 2 is a sectional view of a tooth of the conventional pet grooming tool in FIG. 1.

Referring to FIGS. 1 and 2, a conventional pet grooming tool as disclosed in U.S. Pat. No. 7,717,067 B2 is shown to include a handle portion 1 and a pet engageable portion 2. A plurality of teeth 201 are formed in a row along the bottom of the pet engageable portion 2, and an acute edge 202 is formed between two adjacent ones of the teeth 201. Such pet grooming tool can only be utilized for grooming a short-hair pet due to the dense arrangement of the short teeth 201, and can not access the undercoat of a pet.

Figure 3:
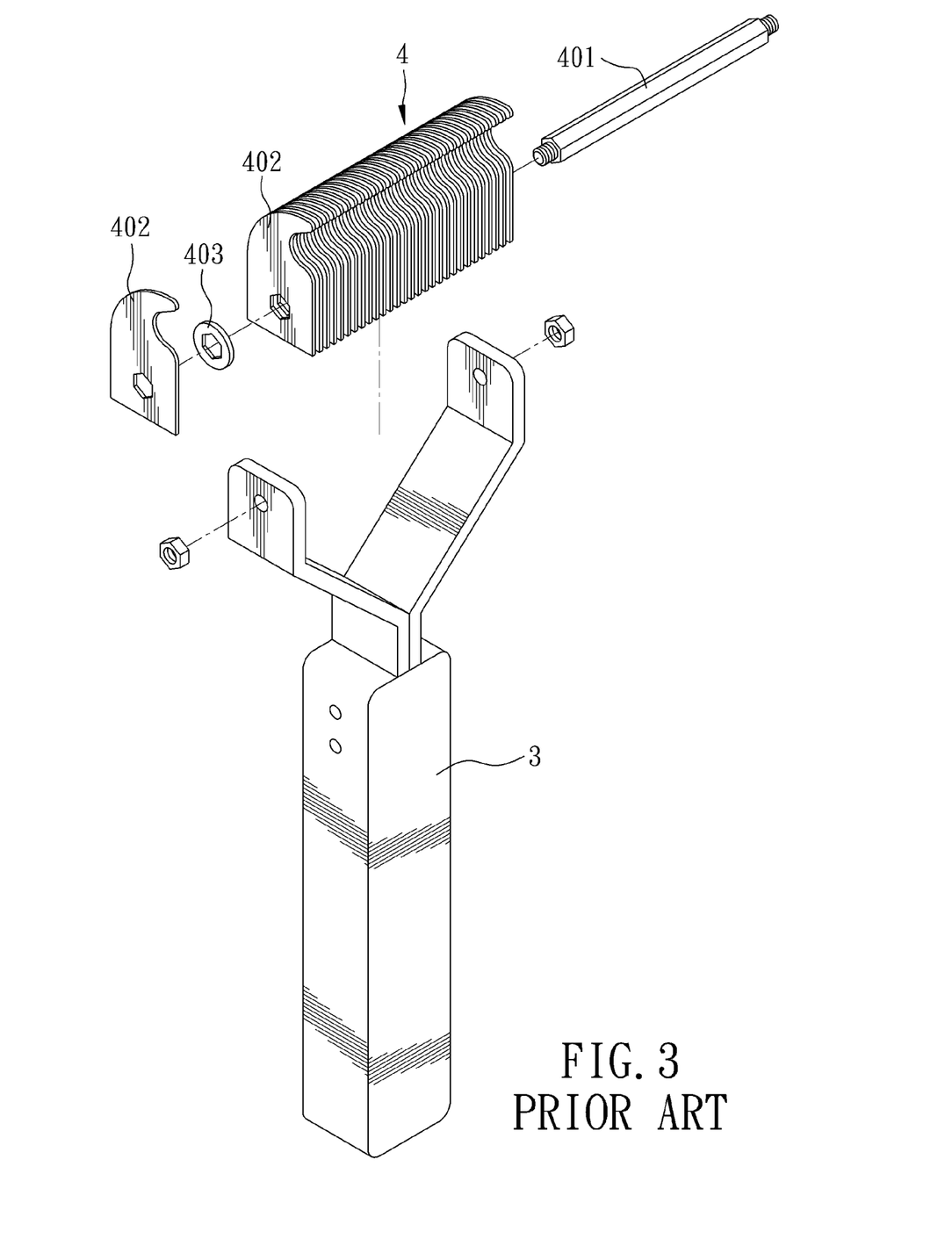
FIG. 3 is an exploded perspective view of another conventional pet grooming tool.

Referring to FIG. 3, another conventional pet grooming tool includes a longitudinal handle 3 and a pet engageable assembly 4 which has a plurality of flat tines 402 sleeved on amounting shaft 401 to be secured between two lug ends of the handle 3. A spacer 403 is interposed between every two adjacent ones of the flat tines 402. Such pet grooming tool can only be utilized to brush or comb a pet and cannot deal with tangled and matted hair of the pet. Hence, a cutting tool is additionally needed when grooming a pet. It is quite difficult for a user to perform a grooming operation with one hand holding two separate tools and the other hand holding and comforting the pet.

Figure 4:
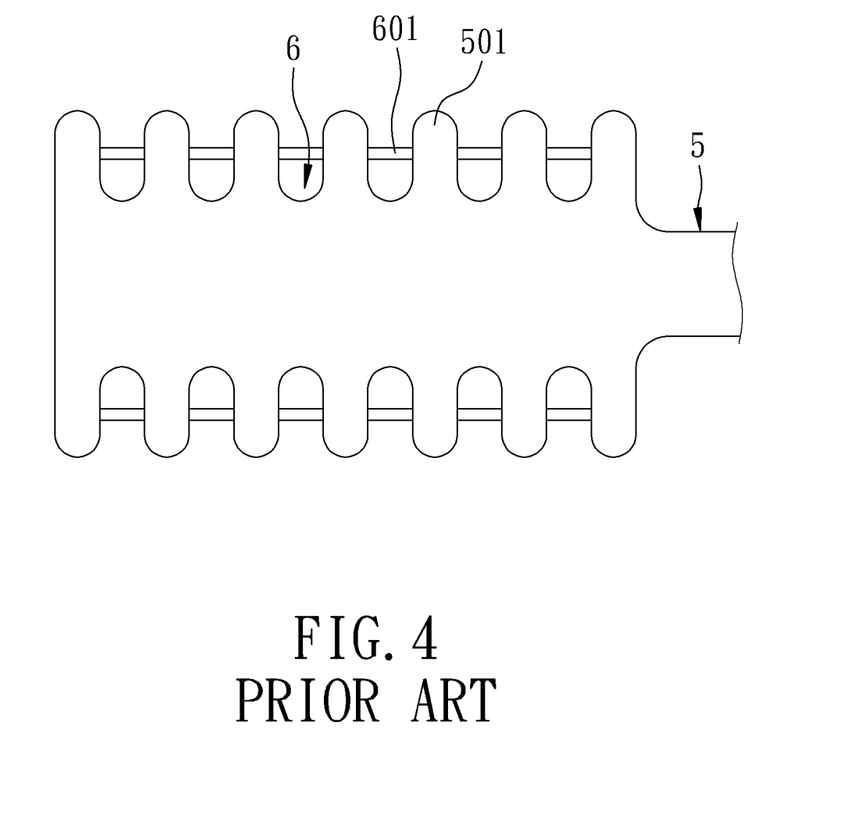
FIG. 4 is a plan view of still another conventional pet grooming tool.

Referring to FIG. 4, still another conventional pet grooming tool is in the form of a cutter which has a cutting blade 6 mounted on a comb body 5. Each of cutting edges 601 is exposed between teeth 501 of the comb body 5. Such pet grooming tool can only be utilized to cut the ends of hair, and may cause over-cutting.

SUMMARY OF THE INVENTION

An object of the present invention is to provide a pet grooming tool which can be used to cut tangles or mats of pet hair when grooming so that the grooming operation can be performed conveniently.

According to this invention, the pet grooming tool includes two holding arms respectively having two lug ends which are spaced apart from each other, a mounting shaft extending along a shaft axis to terminate at two journals which are secured to the lug ends, a plurality of tine members, each made from a first flat blank which is oriented normal to the shaft axis, and which has a raking region, a base region having a mounting hole that permits the mounting shaft to be inserted fittingly thereinto such that the tine members are juxtaposed with one another between the lug ends, a front edge surface extending from the base region toward the raking region to terminate at a front spot, and a rear edge surface extending from the base region toward the raking region to join with the front edge surface at the front spot to form a tine tip of a respective one of the tine members, and a plurality of dematting members, each made from a second flat blank which has forward and rearward edge surfaces, and which is oriented normal to the shaft axis. The second flat blank has dematting blade and mount regions opposite to each other. The dematting blade region extends to terminate at an inclined distal edge surface which joins the forward and rearward edge surfaces, respectively, at a forward spot and a rearward spot that is closer to the mount region than the forward spot. The dematting blade region has a blade cutout portion which extends from the inclined distal edge surface adjacent to the forward spot toward the mount region to form a dematting blade tip of a respective one of the dematting members. The mount region has a mount bore configured to permit the mounting shaft to be inserted fittingly thereinto such that each of the first tine members is interposed between two adjacent ones of the dematting members, and such that the dematting blade tip is disposed rearward from the first tine tip.

The pet grooming tool will rake or comb a pet by means of the tine members while cutting and removing tangles and mats of the undercoat of the pet by means of the dematting members.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Before the present invention is described in greater detail, it should be noted that same reference numerals have been used to denote like elements throughout the specification.

Figure 5:
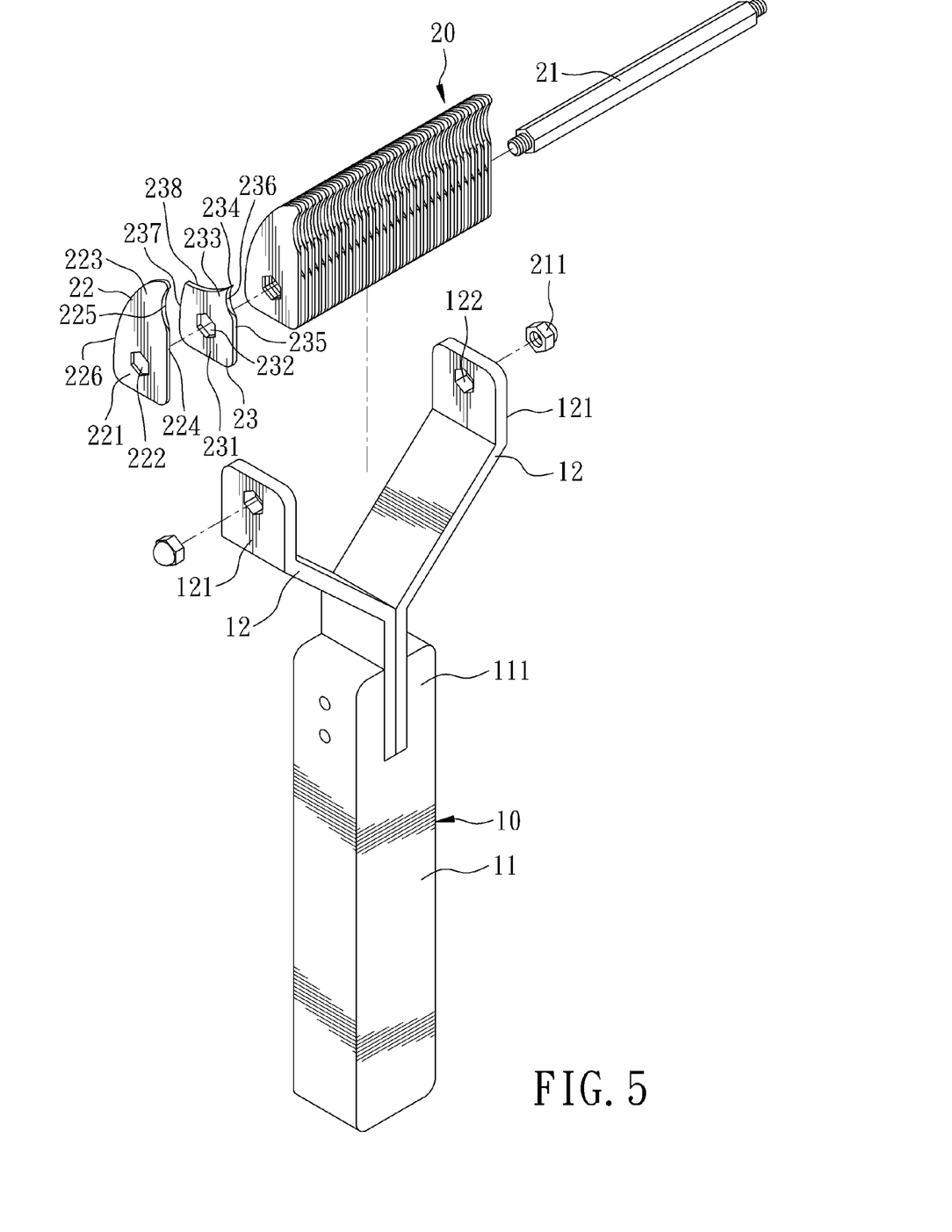
FIG. 5 is an exploded perspective view of a first embodiment of a pet grooming tool according to this invention.
Figure 6:
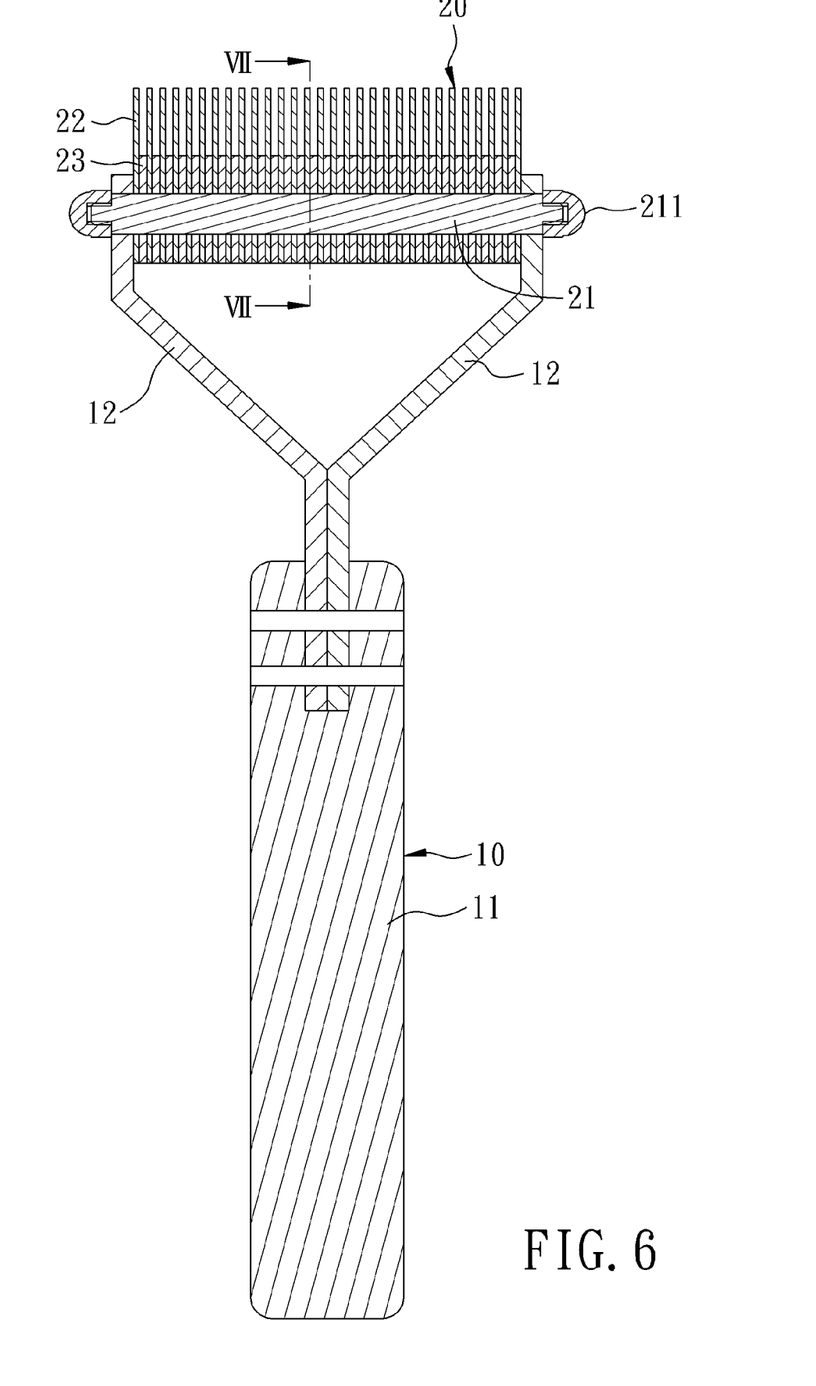
FIG. 6 is a sectional view of the first embodiment.
Figure 7:
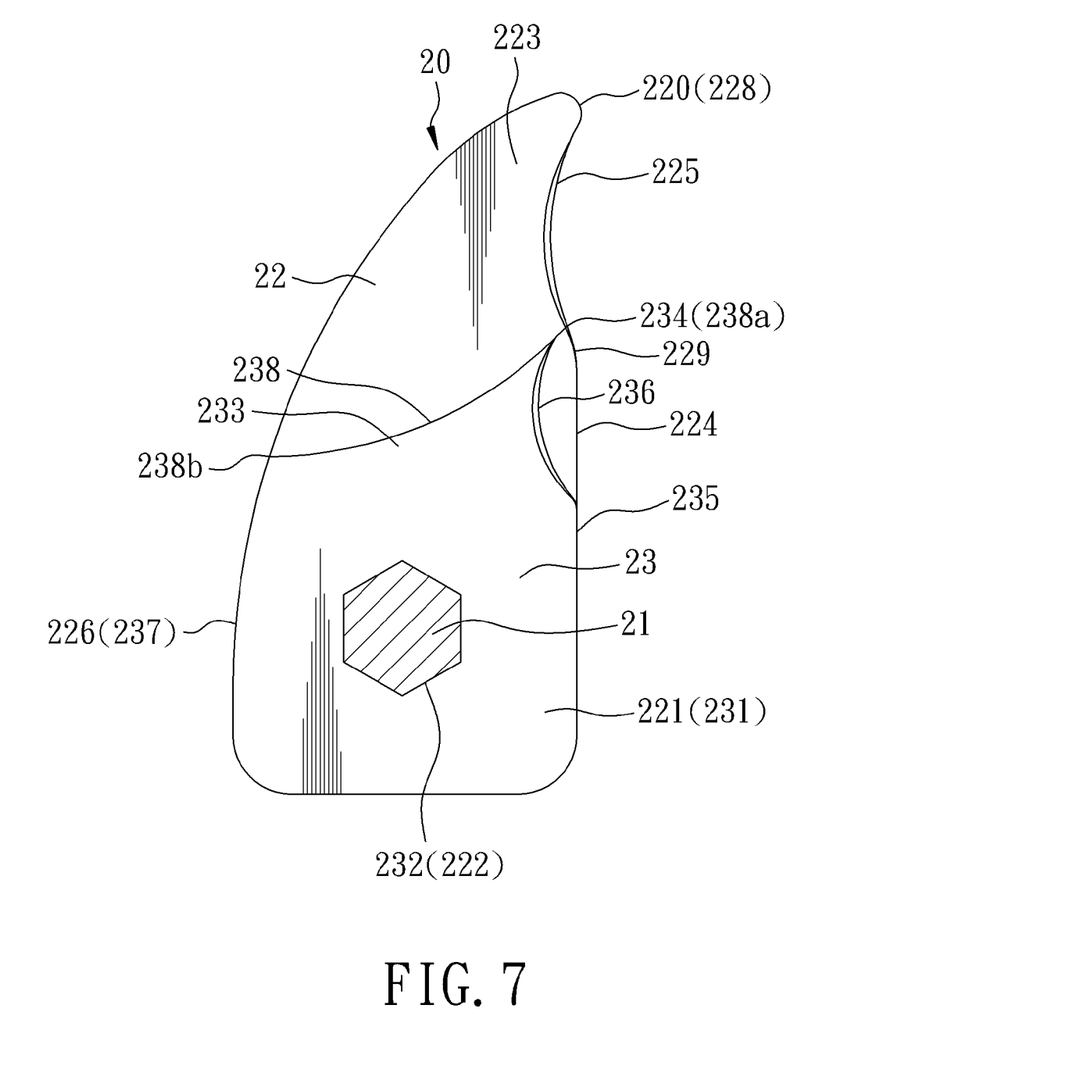
FIG. 7 is a cross-sectional view taken along line VII-VII of FIG. 6.

Referring to FIGS. 5 to 7, the first embodiment of a pet grooming tool according to the present invention is shown to comprise a handle assembly 10 and a pet engageable assembly 20.

The handle assembly 10 has a handle 11 which has a connected end 111 and which extends from the connected end 111 in a longitudinal direction to be manually operable, and two holding arms 12 which are connected to the connected end 111 and which extend to respectively have two lug ends 121. The lug ends 121 are spaced apart from each other in a first transverse direction that is transverse to the longitudinal direction and respectively have hexagonal holes 122.

The pet engageable assembly 20 includes amounting shaft 21, a plurality of first tine members 22, and a plurality of dematting members 23.

The mounting shaft 21 has a hexagonal cross-section and extends along a shaft axis in the first transverse direction to terminate at two threaded journals which are secured to the hexagonal holes 122 along the shaft axis by screw nuts 211.

The first tine members 22 and the dematting members 23 are juxtaposed with and alternately arranged with each other in a row of the first transverse direction. Each of the first tine members 22 is made from a first flat blank which is oriented normal to the shaft axis, and which has first raking and base regions 223, 221 opposite to each other in the longitudinal direction. The first flat blank has a first front edge surface 224 which extends from the first base region 221 toward the first raking region 223 in the longitudinal direction to terminate at a front spot 228, and a first rear edge surface 226 which is opposite to the first front edge surface 224 in a second transverse direction that is transverse to the longitudinal and first transverse directions, and which extends from the first base region 221 toward the first raking region 223 to join with the first front edge surface 224 at the front spot 228 to form a first tine tip 220 of the respective first tine member 22. The first base region 221 has a hexagonal first mounting hole 222 which permits the mounting shaft 21 to be inserted fittingly thereinto such that the first tine members 22 are juxtaposed with one another between the lug ends 121. In this embodiment, the first raking region 223 of each first tine member 22 has a tine cutout portion 225 which extends immediately from the first tine tip 220 toward the first base region 221 and which is arcuated and concaved rearwardly so as to render the first tine tip 220 more forwardly protruding and to terminate at a first juncture spot 229 on the first front edge surface 224. The first tine tip 220 is rounded so as to prevent injury to a user, a pet and bystanders.

Each of the dematting members 23 is made from a second flat blank which has forward and rearward edge surfaces 235, 237 opposite to each other in the second transverse direction, and which is oriented normal to the shaft axis. The second flat blank has dematting blade and mount regions 233, 231 opposite to each other in the longitudinal direction. The dematting blade region 233 extends in the longitudinal direction to terminate at an inclined distal edge surface 238 which joins the forward and rearward edge surfaces 235, 237, respectively, at a forward spot (238a) and a rearward spot (238b) that is closer to the mount region 231 than the forward spot (238a). The dematting blade region 233 has a blade cutout portion 236 which extends from the inclined distal edge surface 238 adjacent to the forward spot (238a) toward the mount region 231 to form a dematting blade tip 234 of a respective one of the dematting members 23. The blade cutout portion 236 is arcuated and concaved rearwardly. The mount region 231 has a hexagonal mount bore 232 which permits the mounting shaft 21 to be inserted fittingly thereinto such that each of the first tine members 22 is interposed between two adjacent ones of the dematting members 23. The dematting blade tip 234 is disposed rearward from the first juncture spot 229 for preventing damage to a user and a pet.

In use, the user grips the handle 11 to rake or comb a pet by means of the first tine members 22 to initially separate tangles or mats. Immediately thereafter, tangles or mats near to the undercoat of a pet can be smoothly cut and removed from the pet fur by means of the dematting blade tips 234 during the operation. Therefore, the pet grooming tool of this embodiment can be utilized to groom a pet while cutting and removing mats and can prevent overcutting. The pet grooming tool according to this embodiment is suitable for middle and short-hair pets.

Figure 8:
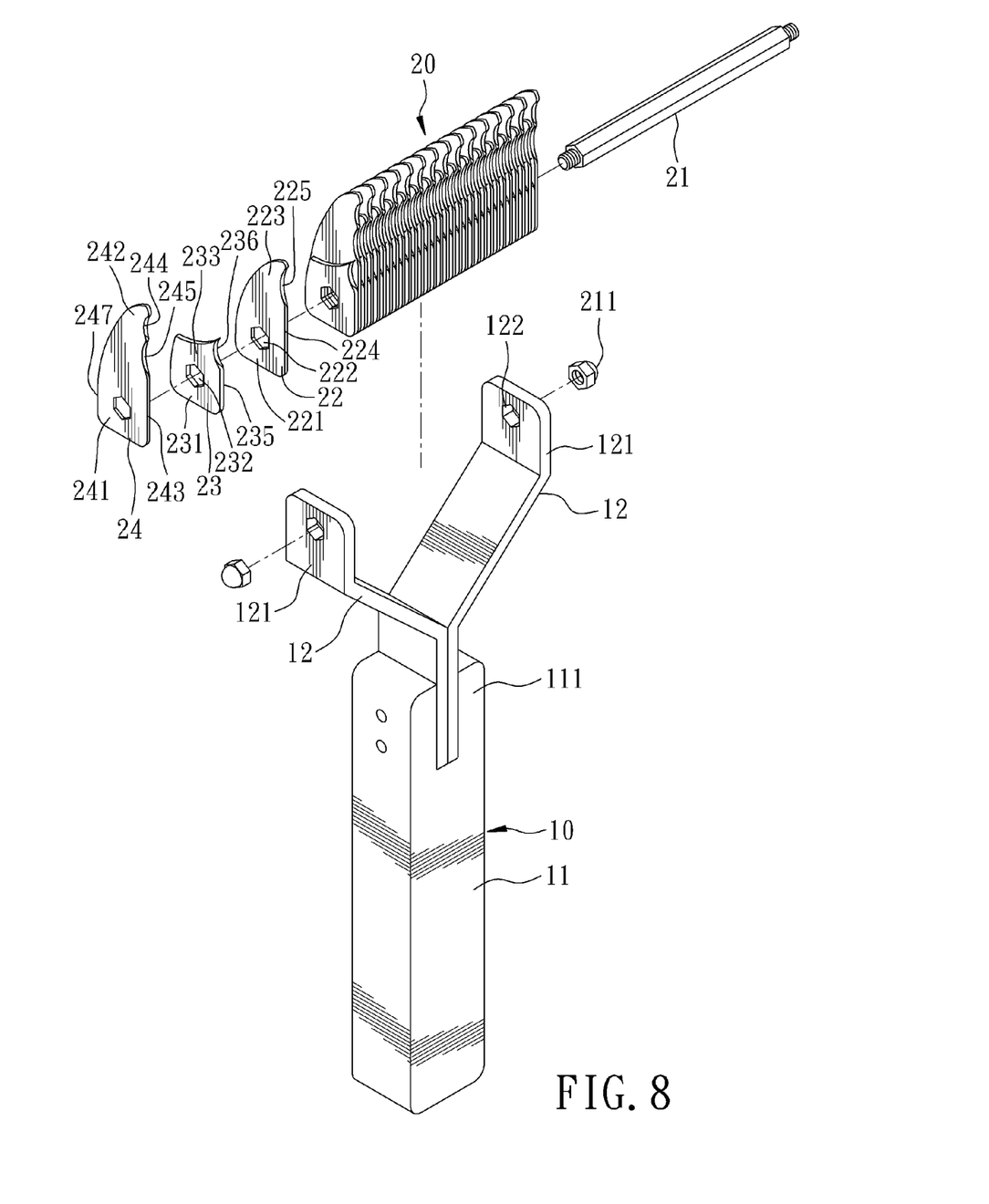
FIG. 8 is an exploded perspective view of a second embodiment of a pet grooming tool according to this invention.
Figure 9:
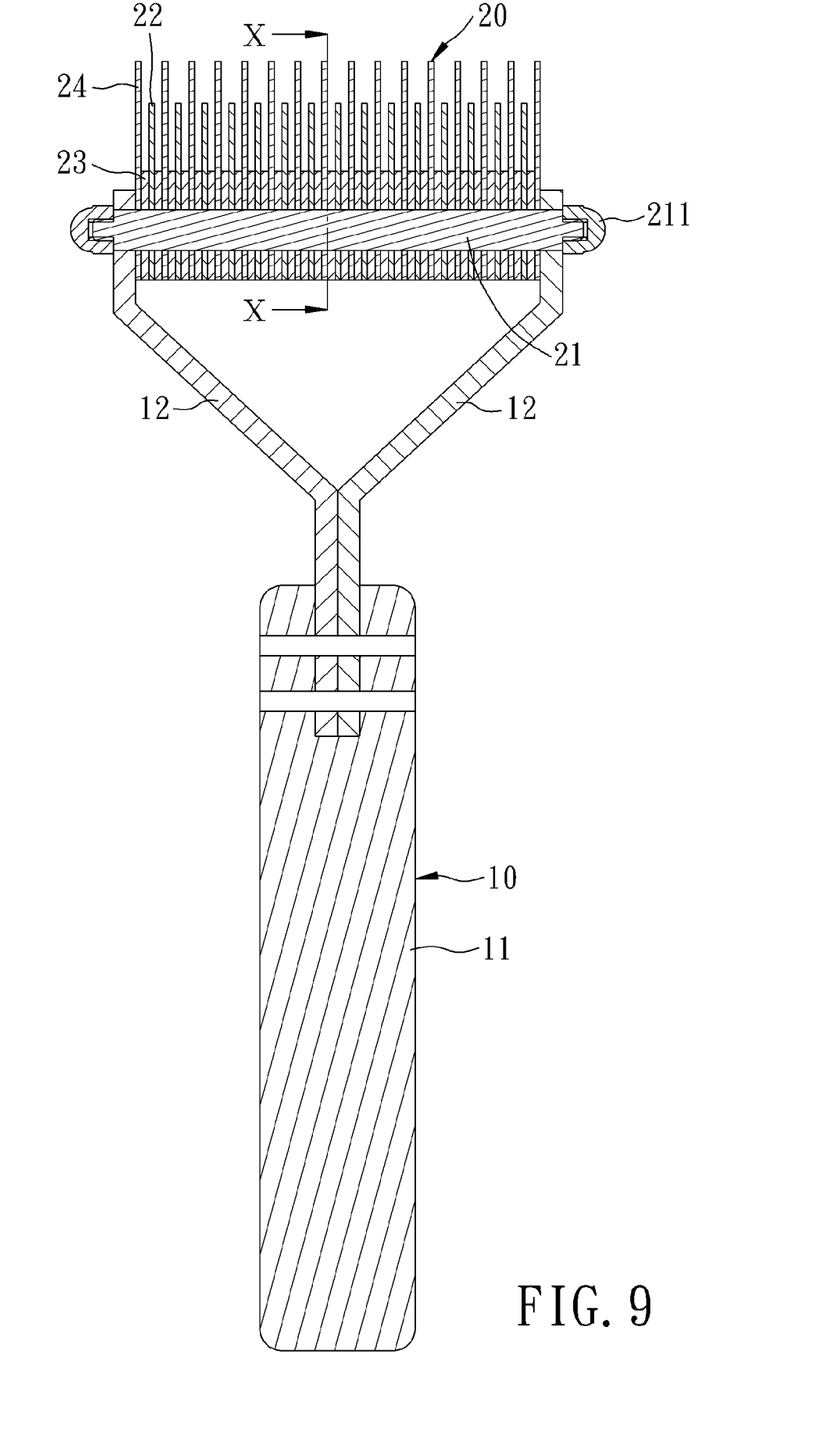
FIG. 9 is a sectional view of the second embodiment.
Figure 10:
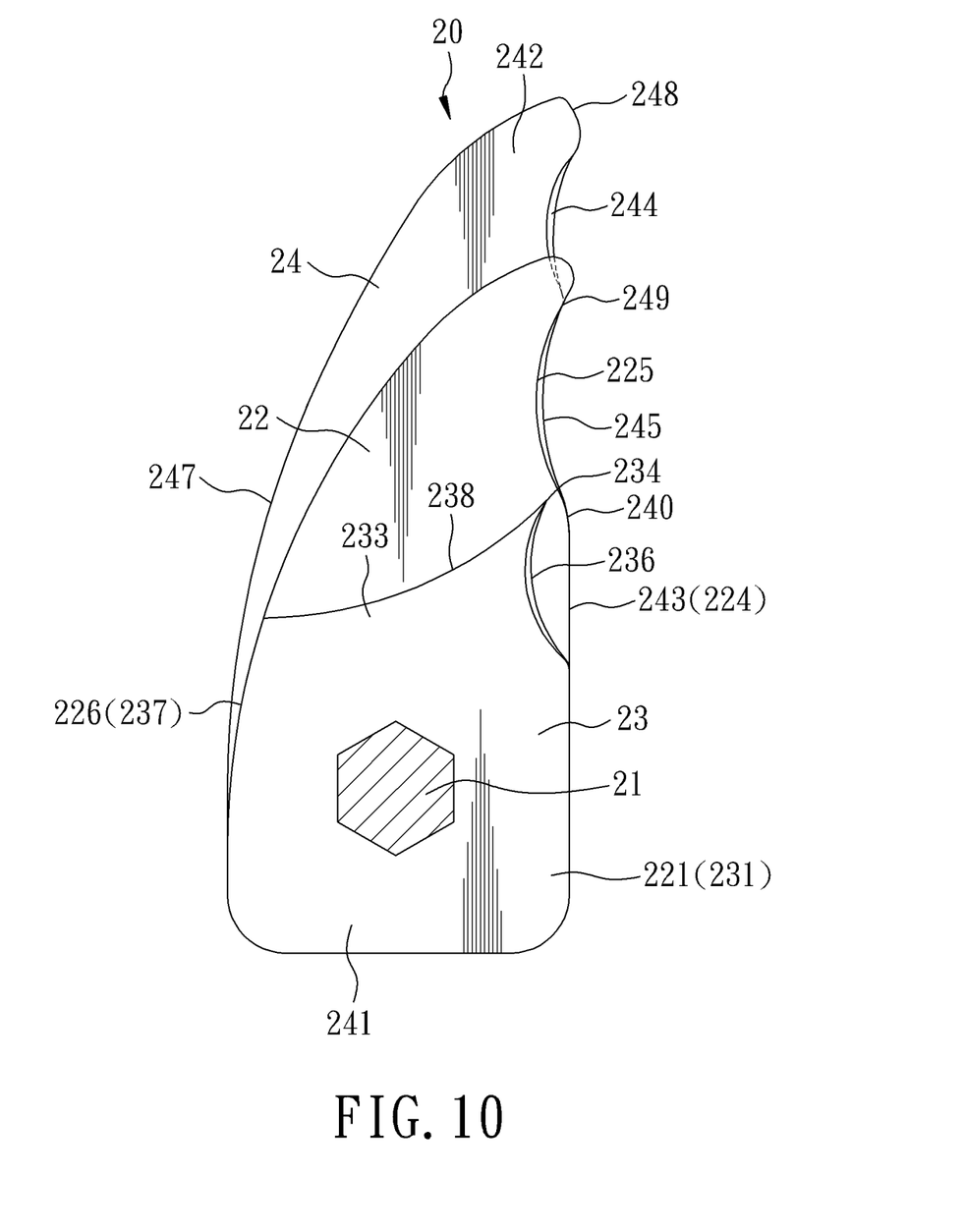
FIG. 10 is a cross-sectional view taken along line X-X of FIG. 9.

Referring to FIGS. 8 to 10, the second embodiment of the pet grooming tool according to this invention is similar to the first embodiment. In the second embodiment, the pet engageable assembly 20 further includes a plurality of second tine members 24, each interposed between two adjacent ones of the dematting members 23 such that each of the dematting members 23 is interposed between one of the first tine members 22 and an adjacent one of the second tine members 24. Each second tine member 24 is made from a third flat blank which has second front and rear edge surfaces 243, 247 opposite to each other in the second transverse direction, and which is oriented normal to the shaft axis of the mounting shaft 21. The third flat blank has second raking and base regions 242, 241 opposite to each other in the longitudinal direction such that the second front edge surface 243 extends from the second base region 241 toward the second raking region 242 to terminate at a distal spot 248 on the second rear edge surface 247. The second raking region 242 has an initial cutout portion 244 extending immediately from the distal spot 248 toward the second base region 241 to terminate at a proximate spot 249 on the second front edge surface 243, and an ending cutout portion 245 extending immediately from the proximate spot 249 toward the second base region 241 to terminate at a second juncture spot 240 which is disposed forwardly from the dematting blade tip 234. The ending cutout portion 245 is configured to be flush with the tine cutout portion 225 in the first transverse direction. Each of the initial and ending cutout portions 244, 245 is also arcuated and concaved rearwardly.

Accordingly, when raking or combing a pet using the pet grooming tool of this embodiment, tangles or mats of fur at different length positions can be initially and successively separated by the distal and proximate spots and subsequently removed by the dematting blade tips 234. Hence, the pet grooming tool according to this embodiment is suitable for long-, middle- and short-hair pets.

Figure 11:
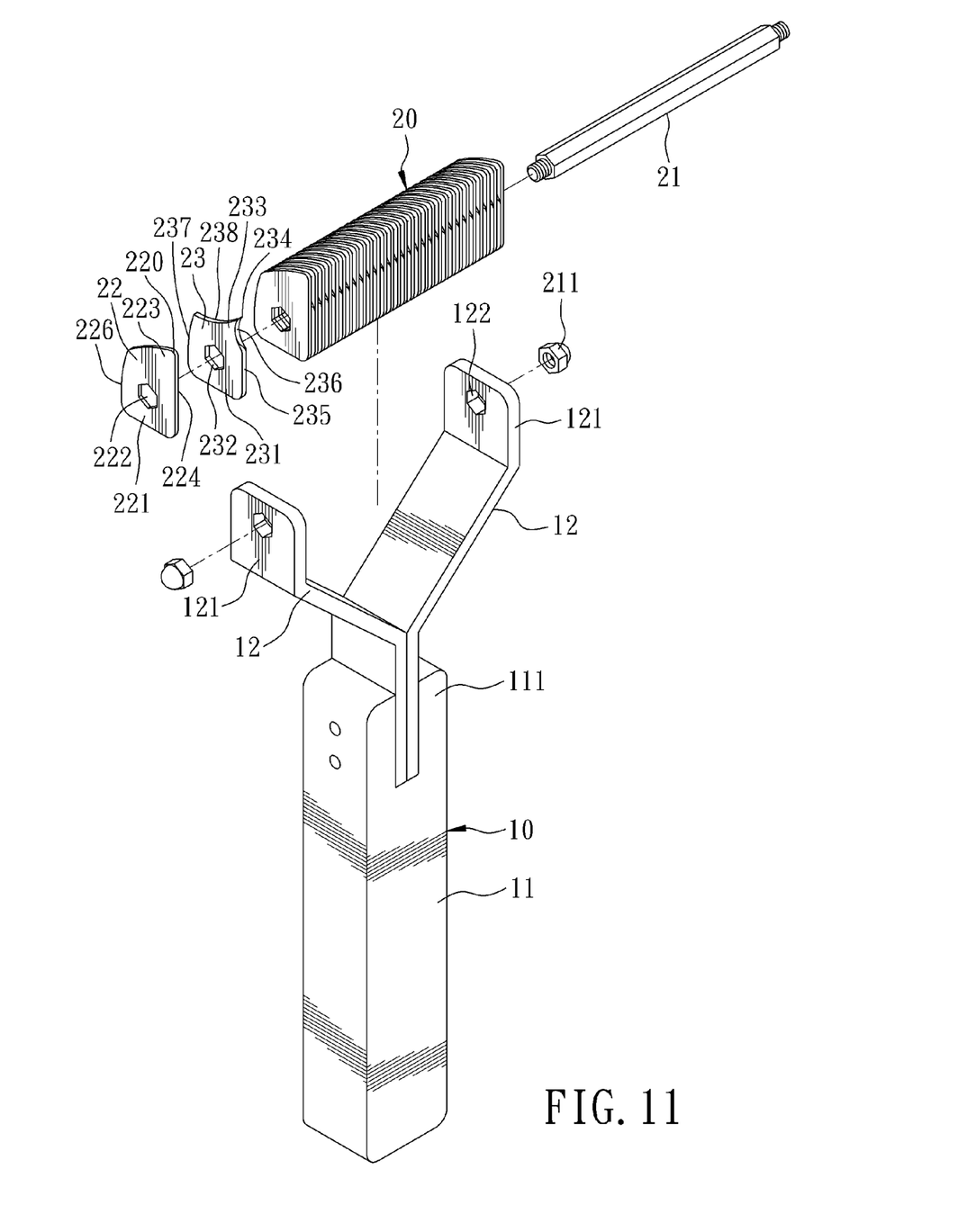
FIG. 11 is an exploded perspective view of a third embodiment of a pet grooming tool according to this invention.
Figure 12:
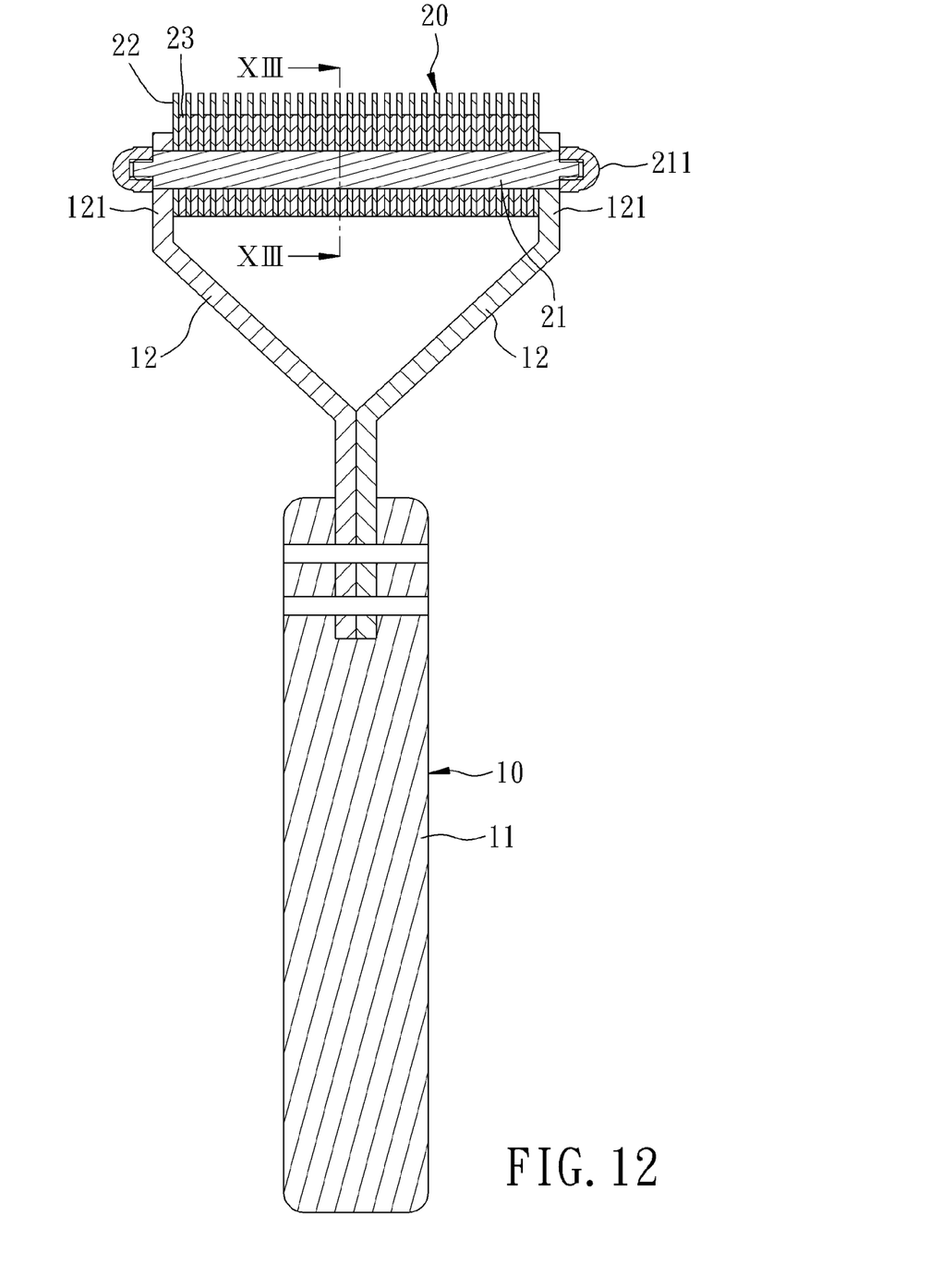
FIG. 12 is a sectional view of the third embodiment.
Figure 13:
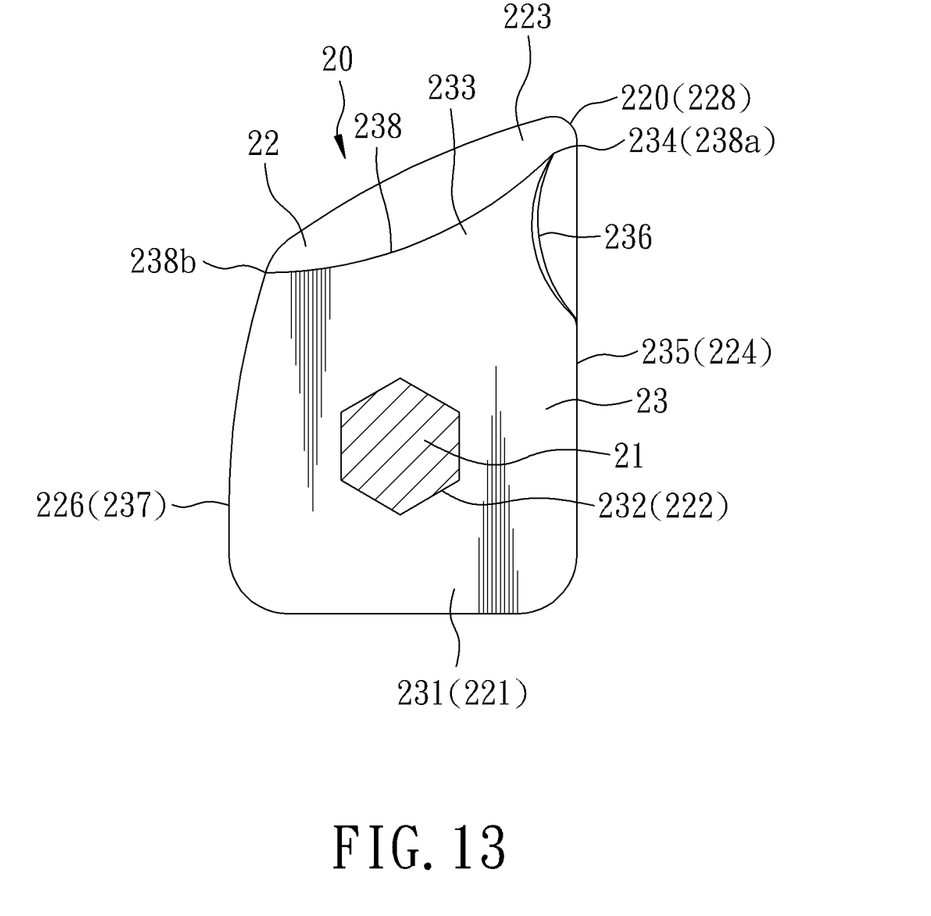
FIG. 13 is a cross-sectional view taken along line XIII-XIII of FIG. 12.

Referring to FIGS. 11 to 13, the third embodiment of the pet grooming tool according to this invention is similar to the first embodiment in construction, except that the first front edge surface 224 extends straightly to form the first tine tip 220 in the second transverse direction without provision of the tine cutout portion 225. The pet grooming tool of this embodiment is suitable for short-hair pets.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A pet grooming tool comprising:
two holding arms respectively having two lug ends which are spaced apart from each other in a first transverse direction;
a mounting shaft extending along a shaft axis in the first transverse direction to terminate at two journals which are respectively secured to said lug ends along the shaft axis;
a plurality of first tine members, each made from a first flat blank which is oriented normal to the shaft axis, and which has first raking and base regions opposite to each other in a longitudinal direction transverse to the first transverse direction, said first flat blank having a first front edge surface which extends from said first base region toward said first raking region in the longitudinal direction to terminate at a front spot, and a first rear edge surface which is opposite to said first front edge surface in a second transverse direction that is transverse to the longitudinal and first transverse directions, and which extends from said first base region toward said first raking region to join with said first front edge surface at said front spot to form a first tine tip of a respective one of said first tine members, said first base region having a first mounting hole which permits said mounting shaft to be inserted fittingly thereinto such that said first tine members are juxtaposed with one another between said lug ends; and a plurality of dematting members, each made from a second flat blank which has forward and rearward edge surfaces opposite to each other in the second transverse direction, and which is oriented normal to the shaft axis, said second flat blank having dematting blade and mount regions opposite to each other in the longitudinal direction, said dematting blade region extending in the longitudinal direction to terminate at an inclined distal edge surface which joins said forward and rearward edge surfaces, respectively, at a forward spot and a rearward spot that is closer to said mount region than said forward spot, said forward edge surface having a blade cutout portion which extends from said forward spot toward said mount region so as to form a dematting blade tip having a sharp point at said forward spot, said mount region having a mount bore which permits said mounting shaft to be inserted fittingly thereinto such that each of said first tine members is interposed between two adjacent ones of said dematting members, and such that said dematting blade tip is disposed rearward from and below said first tine tip, wherein said blade cutout portions and said dematting blade tips of said dematting members are indented relative to said first front edge surfaces of said first tine members.

2. The pet grooming tool as claimed in claim 1, wherein said blade cutout portion is arcuated and concaved rearwardly.

3. The pet grooming tool as claimed in claim 1, wherein said first raking region of each of said first tine members has a tine cutout portion which extends immediately from said first tine tip toward said first base region to render said first tine tip more forwardly protruding and to terminate at a first juncture spot on said first front edge surface, and which is disposed forwardly from said dematting blade tip and remoter from said first base region than said dematting blade tip.

4. The pet grooming tool as claimed in claim 3, wherein each of said blade and tine cutout portions is arcuated and concaved rearwardly.

5. The pet grooming tool as claimed in claim 4, wherein said first tine tip is rounded.

6. The pet grooming tool as claimed in claim 4, further comprising a plurality of second tine members, each interposed between two adjacent ones of said dematting members, and each made from a third flat blank which has second front and rear edge surfaces opposite to each other in the second transverse direction, and which is oriented normal to the shaft axis, said third flat blank having second raking and base regions opposite to each other in the longitudinal direction such that said second front edge surface extends from said second base region toward said second raking region to terminate at a distal spot on said second rear edge surface, said second raking region having an initial cutout portion extending immediately from said distal spot toward said second base region to terminate at a proximate spot on said second front edge surface, and an ending cutout portion extending immediately from said proximate spot toward said second base region to terminate at a second juncture spot which is disposed forwardly from said dematting blade tip.

7. The pet grooming tool as claimed in claim 6, wherein each of said initial and ending cutout portions is arcuated and concaved rearwardly.

8. The pet grooming tool as claimed in claim 1, further comprising a handle which has a connected end connected to said holding arms and which extends from said connected end in the longitudinal direction to be manually operable.

\* \* \* \* \*